United States Patent
Hanke et al.

(10) Patent No.: US 6,471,593 B1
(45) Date of Patent: Oct. 29, 2002

(54) DEVICE FOR ABSORBING OSCILLATIONS, ESPECIALLY AN OSCILLATION DAMPER

(75) Inventors: Wolfgang Hanke; Rolf Brockmann, both of Heidenheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 09/463,064
(22) PCT Filed: May 14, 1999
(86) PCT No.: PCT/EP99/03324
§ 371 (c)(1), (2), (4) Date: Mar. 16, 2000
(87) PCT Pub. No.: WO99/60286
PCT Pub. Date: Nov. 25, 1999

(30) Foreign Application Priority Data

May 19, 1998 (DE) .......................... 198 22 540

(51) Int. Cl.$^7$ ................................. F16D 3/66
(52) U.S. Cl. ...................... 464/68; 464/180; 464/24; 74/574
(58) Field of Search ................ 464/7, 24, 68, 464/180; 74/574; 192/208, 212; 188/378–380

(56) References Cited

U.S. PATENT DOCUMENTS

| | | | |
|---|---|---|---|
| 1,359,848 A | * 11/1920 | Techel | ................ 464/24 X |
| 1,445,715 A | * 2/1923 | Robinson et al. | .......... 464/66 X |
| 3,681,939 A | * 8/1972 | Timtner et al. | ................ 464/84 |
| 3,993,151 A | * 11/1976 | Wirth | |
| 4,232,534 A | * 11/1980 | Lamarche | ................. 464/68 |
| 4,565,273 A | * 1/1986 | Tojima et al. | ............ 464/68 X |
| 4,775,042 A | * 10/1988 | Kohno et al. | ............. 464/24 X |
| 5,064,042 A | 11/1991 | Kuhne et al. | |
| 5,156,066 A | 10/1992 | Janiszewski | ................. 74/574 |
| 5,307,710 A | 5/1994 | Feldhaus et al. | .............. 74/574 |

FOREIGN PATENT DOCUMENTS

| | | |
|---|---|---|
| DE | 28 48 748 | 3/1981 |
| DE | 39 31 428 | 4/1990 |
| DE | 39 16 575 | 11/1990 |
| DE | 197 28 894 | 7/1997 |
| EP | 0 423 089 | 4/1991 |

OTHER PUBLICATIONS

Merriam–Webster's Collegiate Dictionary, 10th ed., Merriam–Webster Inc., Springfield, MA, 1997, p. 1215.*

* cited by examiner

Primary Examiner—Lynne H. Browne
Assistant Examiner—Greg Binda
(74) Attorney, Agent, or Firm—Baker & Daniels

(57) ABSTRACT

The invention relates to a device for oscillation damping in rotating constructional elements, comprising two oscillating masses, a primary and a secondary mass, that can be rotated in a limited manner in relation to each other in the peripheral direction. The primary and the secondary masses can be coupled to each other by means of a damping and spring coupling. The device comprises means for accomplishing spring coupling including at least one spring device. The invention is characterized by the following features: each spring device comprises at least two spring elements; the spring element of the spring device are pretensioned; the spring element of a spring device are allocated to the primary and the secondary masses in such a way that the spring elements are supported against each other.

14 Claims, 13 Drawing Sheets

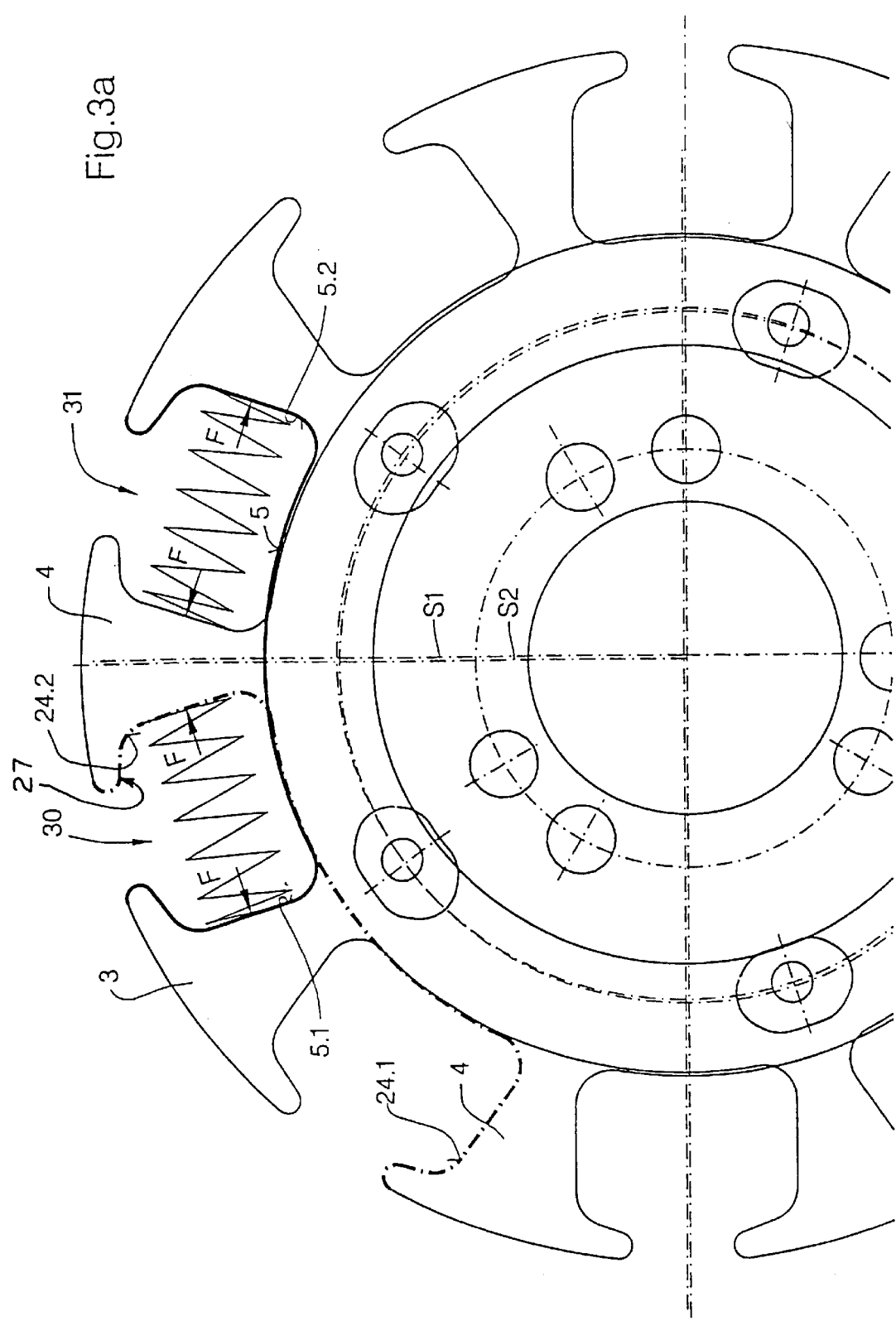

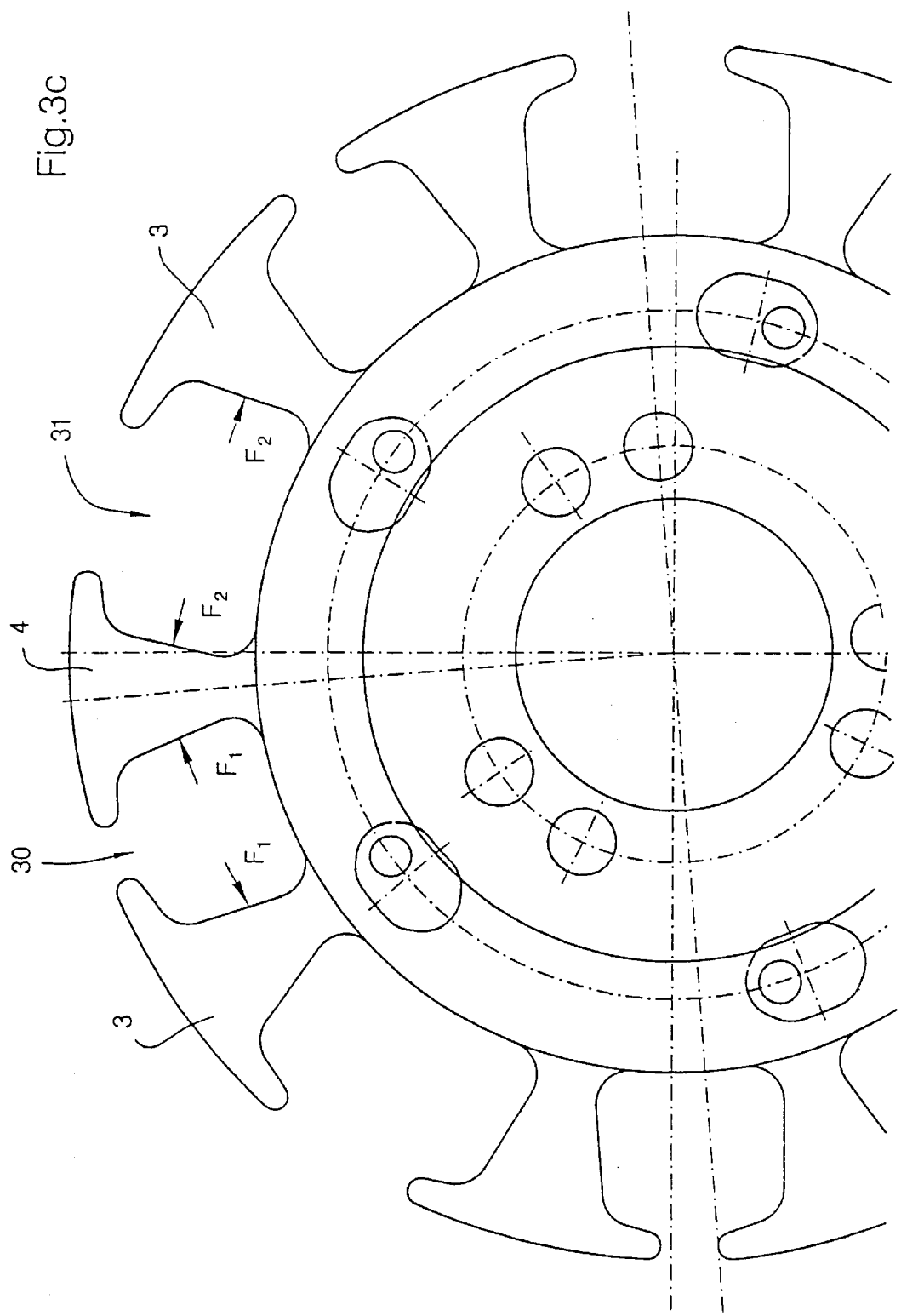

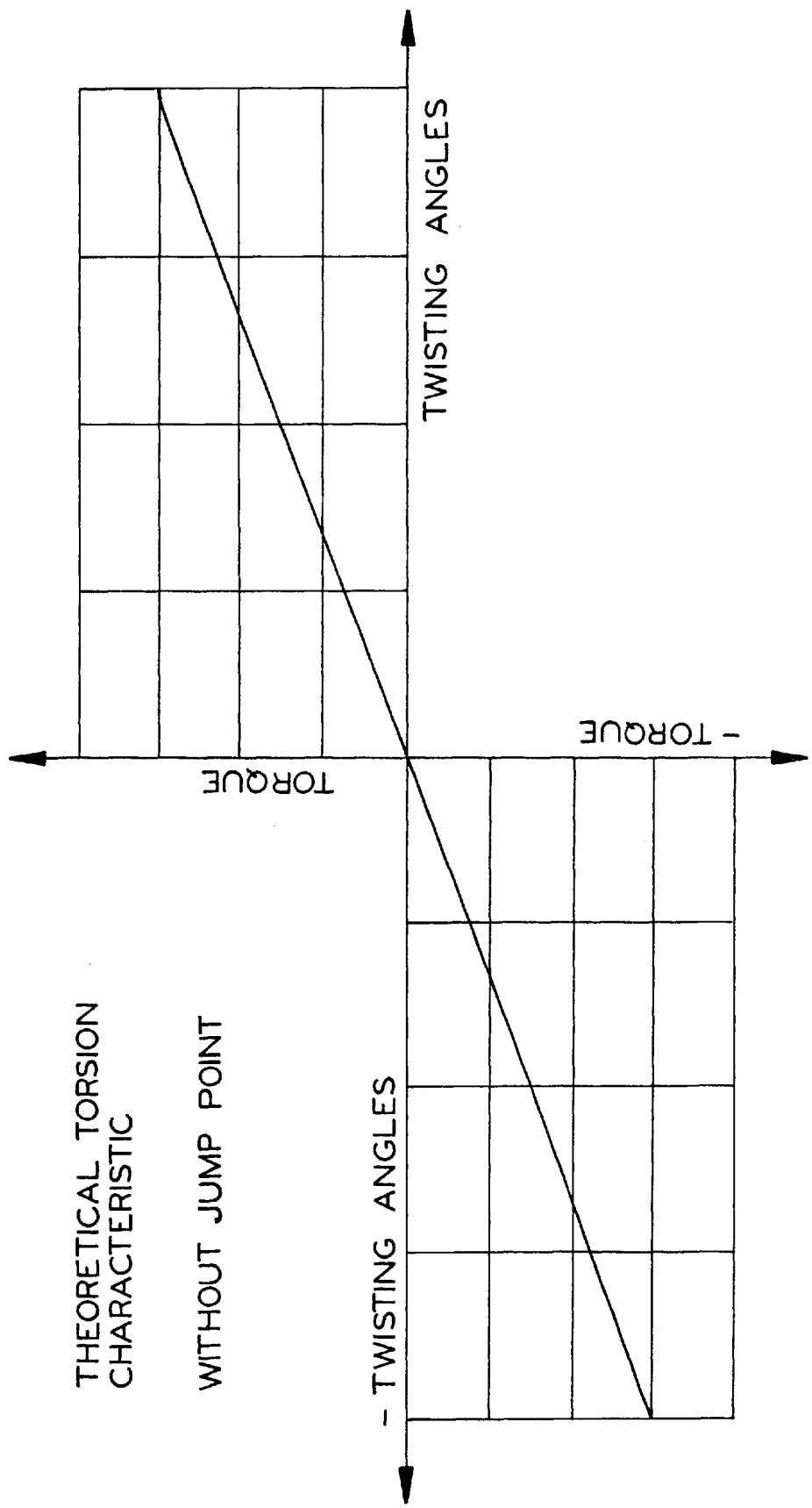

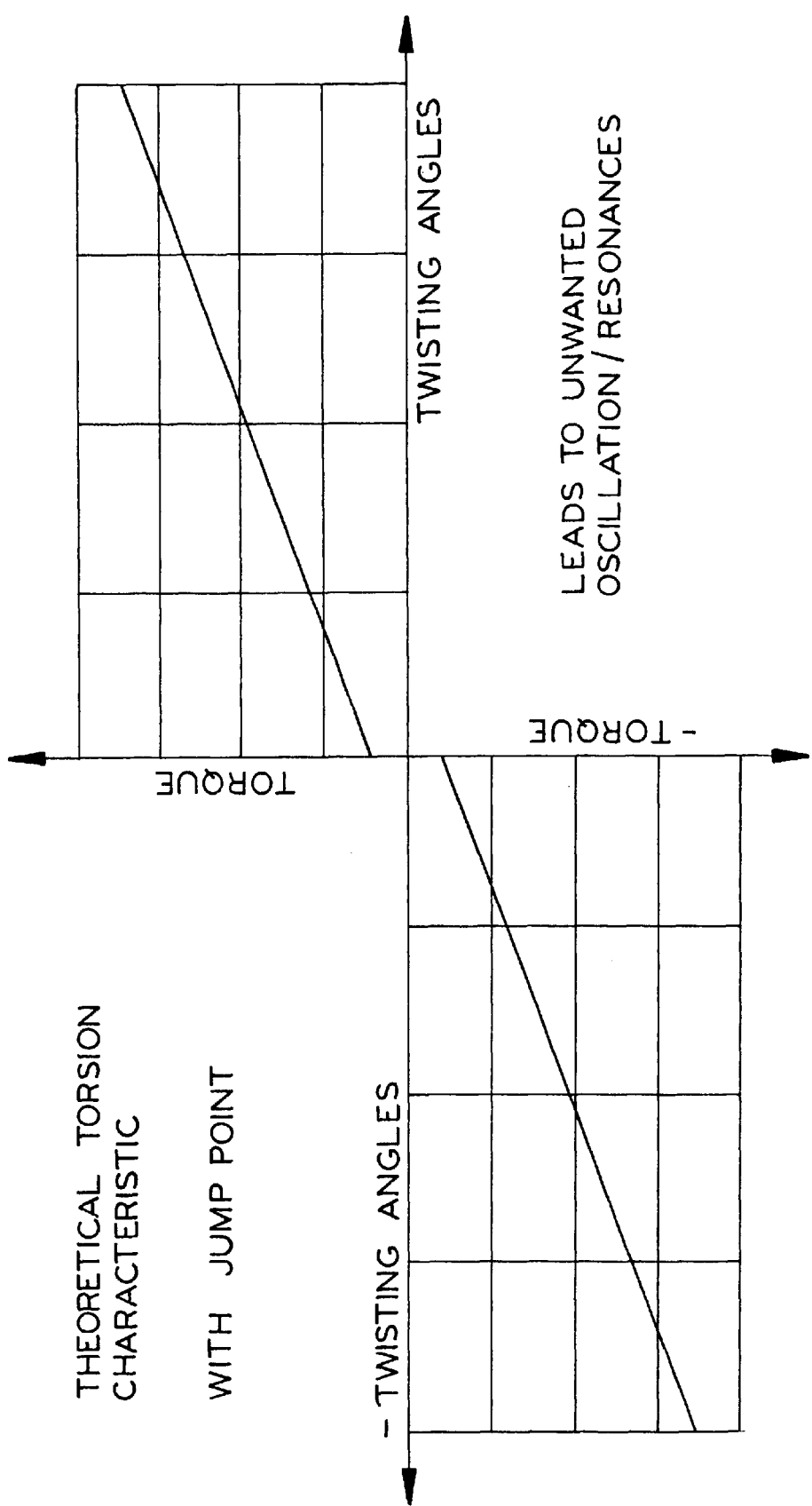

DEVICE FOR ABSORBING OSCILLATIONS, ESPECIALLY AN OSCILLATION DAMPER

FIELD OF THE INVENTIONS

The invention relates to a device for damping oscillations of a rotating construction element, in particular an oscillation absorber.

DESCRIPTION OF THE RELATED ART

The expression "Device for damping oscillations" is to be understood in the broadest sense. It can be a matter here of so-called oscillation dampers, vibration damping arrangements or combined arrangements between oscillation damper and vibration damper. By oscillation damper there is meant here a device which serves for the decomposition of occurring vibrations, especially on rotating construction components, and not for the damping of oscillations in the torque transfer between two components in the drive string. A damper, therefore, does not participate primarily in the torque transmission during the entire operation from a drive side to an off-drive side. In a vibration damping arrangement it is a matter as a rule of an elastic coupling which is arranged between two construction components, for example a combustion power machine and a gear. Such couplings do not serve to transfer torsional oscillations from the rotor to the remaining drive string. Such an elastic coupling is disclosed in the application DE PS 28 48 748. In DE 197 28 894 there is disclosed a combined oscillation eradicator-damper arrangement. The spring arrangements provided there between the two elements—primary mass and secondary mass—serve for the carrying along of the secondary mass during the starting phase and the acceleration phases. Otherwise there occurs substantially no torque transmission.

Devices for the damping of oscillations (or vibrations) are formed in such manner that the critical turning rate of the total mass system lies sufficiently far below the operating range. There, in the passing-through of the critical turning rate no great amplitudes, and no great torsion moments in the individual elements are to arise.

Essential elements of an oscillation suppressor or of a damper are a damping arrangement as well as a spring arrangement. The damping arrangement comprises chambers which are connected in conducive connection via channels of defined width. There, during operation, a damping agent is displaced from the one chamber via the channel into the adjacent chamber. The spring arrangement comprises a plurality of springs, which are mounted on a circuit coaxial to the damper or suppressor axis.

In practice it is proved that torsional vibrations are not damped as strongly as is desired. Resonance vibrations arise. These can be very disadvantageous, In the printing industry, for example, they can lead to so-called register inaccuracies.

Underlying the invention is the problem of giving a device for the damping of oscillations, in particular a vibration eradicator, in which all vibrations (or oscillations) are perfectly damped or eradicated in such manner that no undesired resonances arise which impair the work result.

This problem is solved by features of the independent claims.

An essential insight lies in that in known devices for vibration damping, in particular in oscillation dampers, the force-path diagram or the spring characteristic curve has no absolutely linear course, but presents at least one jump point or a free-floating course. This means that in the allocation of load and the deformation of the spring in the load change in the first case a greater force brings about no deformation, while in the second case, without force action, a certain expansion of the spring or a contraction would be possible. The inventors have first recognized that this jump point or the free-floating are (sic) responsible for undesired resonances. Then, they have drawn from this fact the conclusion that the region or zone of the jump place or of the free floating must be avoided in operation, and that, accordingly, the work must be done either only in the so-called compression zone or in the so-called expansion zone, in which the compression can be characterized essentially by thrust stress and reduction of the spring length and the expansion zone can be characterized by tension load and increase of the spring length. This means, in other words, that the spring device(s) is to be correspondingly pre-tensioned in order to achieve shortening or lengthening of the spring length for the compensation of the relative movements of the individual masses to one another in peripheral direction to one another, so that the transition range between thrust and pull is not affected at all during suspension of a pretension. There, for constructive reasons it is to be preferred to pretension spring elements in the form of pressure springs.

SUMMARY OF THE INVENTION

According to the invention it is provided to design a device for oscillation damping with a primary mass and with a secondary mass torsionally coupleable, at least indirectly, with the rotating construction element, in which system primary mass and secondary mass are coupleable in a damping and spring coupling, and means for the realization of the spring coupling are provided in the form of spring arrangements, in such manner that the spring arrangements comprise at least two spring elements which are arranged, as viewed in peripheral direction of the device, pretensioned in succession between primary mass and secondary mass, and the two spring elements of a spring arrangement are supported against one another by support of the primary mass with respect to the secondary mass. Therewith from the characteristic curves of the two spring elements there is developed a characteristic curve for the total spring arrangement which is free from jump points or floating passages.

The pretension there is to be chosen in such manner that on full spring deflection of the first spring elements, i.e. reduction of the spring length under thrust load, the other, second spring element of the spring arrangement, which undergoes an unburdening, still has a pretension of a certain magnitude. In the other case—full spring deflection with lengthening of the spring length in peripheral direction under pull load—the other, second spring element, which is stressed for pressure is still pretensioned. Thereby it is achieved that on alternating load which is characterized by a change of the turning direction of secondary mass with respect to primary mass, only one spring element of the spring arrangement continues to be pretensioned, while the other, second spring element is unburdened and the pretension is in part suspended, in which case an increase of the pretension is to be achieved for both spring elements of a spring arrangement only by the same type of load. A compensation therefore of the relative movements arising between the two masses is to be avoided on only one spring element by change of the stress of one spring element.

Primary mass and/or secondary mass are preferably executed as disk-form elements, in which context primary mass and/or secondary mass comprise either a one disk-form element or two disk-form elements. In the latter case, for example, the element of the device functioning as secondary mass can comprise for the oscillation damping two disk-form elements, in which case the disk-form element of the primary mass is arranged between these two. The converse case is likewise conceivable.

The term "disk-form elements" is to be understood as each disk-form element operates as a single component. Each disk-form element can, in turn, itself be composed of a plurality of disk-form components. As a rule the term primary mass is used in the case of oscillation dampers for the mass parts coupleable at least indirectly torsionally with the rotating component, and the term secondary mass is used in this case for the freely oscillating mass part. In the case of oscillation damping arrangements there is understood under the designation "primary mass" as a rule the mass part torsionally coupled with the drive side, while as secondary mass there is designated the mass part connectable torsionally with the off-drive side.

In the constructive execution for the realization of the arrangement of the spring arrangements the primary mass comprises first recesses running in peripheral direction. The secondary mass comprises second recesses essentially complementary to the first recesses on the primary mass with respect to their spacing and size, in which the installation position in the nonfunctioning state (no occurrence of oscillations), the so-called middle position or zero-turning between primary mass and secondary mass is characterized in that the recesses on the primary mass and of the secondary mass overlap one another in such manner that the wall zones of the secondary mass supporting the spring elements in peripheral direction are arranged about in the middle of the recess of the primary mass. In other words, the secondary mass, with identical formation of the recesses in respect to their recess in peripheral direction can be arranged offset by half the extent of the recess of the primary mass in peripheral direction. Through this arrangement in the so-called middle position, i.e. in installation position without exercise of function, the zone formed theoretically by the recesses on the primary mass are subdivided in two receiving zones for the spring elements, essentially of equal size in peripheral direction. These two spring elements form in common the spring arrangement according to the invention. The spring elements are supported there in peripheral direction on the outer walls of the recess of the primary mass and in each case by the wall areas formed by the secondary mass. To each of the spring elements there is allocated on the spring ends in each case a guide body on which the two masses—primary mass and secondary mass—engage tangentially in the zone of the receiving zones. The spring elements themselves are installed with pretension, the pretension being selected in such manner that on complete spring deflection of a spring element of a spring arrangement the other spring element still has a pretension of a certain magnitude.

As spring elements there can be pulled tension springs or pressure springs. Preferably, however, pressure springs as used, whereby a space-saving execution of the device can be achieved.

The individual guide elements or guide bodies which are designated also as spring "pot", can be formed differentially. Preferably, however, there are used elements laid out alike and executed alike for a given device.

Further, preferably between the primary and the secondary mass means are provided for the damping of longitudinal and/or rotary oscillations, which counteract a relative movement of the primary mass with respect to the secondary mass and transform the work performed by the relative movement of the primary mass with respect to the secondary mass by the thrust forces, for example, into heat. Preferably the damping occurs hydraulically. For this purpose the means for the damping between the primary and the secondary mass comprise a hydraulic fluid, i.e. an incompressible fluid. The use of other media, for example of an elastic material, is likewise conceivable. The damping medium can be provided there in separately, essentially closed-off chambers that are provided with the provision of corresponding recesses complementary to one another, or that can be arranged in the zone of the spring devices. It is likewise thinkable to provide the damping medium in the zone of an arrangement for the realization of a twist angle limitation. Also possible is a complete filling or discharge of the interspace between primary and secondary mass. The supplying with hydraulic fluid as damping medium can occur, for one thing, from outside, during the operation or by exchange via a hydraulic fluid supplying system. Further, the supplying can occur once by means of a separating operating medium supply device, i.e. by a damping filling of its own or else directly from the aggregate to be damped over a corresponding supply line. In this connection there is also thinkable the formation of a circulation which makes it possible to maintain the hydraulic fluid always at a constant temperature.

In the constructive execution the primary mass, which is preferably executed as a disk-form element, is coupleable at least indirectly torsionally (twistproof) with the rotating component in the drive string on which the there appear longitudinal and/or rotary oscillations which are to be compensated. To the primary mass there is allocated the secondary mass, which is allocated to the primary mass without coupling, or else is connected with the drive-side part. The transfer of the longitudinal and/or rotary oscillations or the supporting of these on the secondary mass occurs by means of the spring arrangement. The individual spring arrangements are arranged there preferably over a certain defined diameter in peripheral direction in corresponding recesses on the primary mass and are supported always on the secondary mass. The spacing in peripheral direction is preferably constant. In regard to the concrete constructive execution of the spring support reference can be made to the statements made in this regard corresponding to the publications DE-OS 363-35 043 and DE 39 16 575. The disclosure content of these publications in respect to the possibilities of supporting a spring between two elements is herewith included in its full volume in the disclosure content of the application.

Over the spring arrangements the oscillations on relative movements of the primary mass with respect to the secondary mass are compensated by the latter. In use in the oscillation damper—i.e. in the case of nonoccurrence of longitudinal and/or rotary oscillations on the drive unit on which the drive device for oscillation damping is mounted—there occurs a rotation of primary and secondary masses with the same velocity. This means that no relative movement takes place between the two. The spring devices provided between the two elements—primary mass and secondary mass—serve then merely during the starting phase and the acceleration phases for the carrying-along of the secondary masses; otherwise no torque transfer whatsoever occurs over these. In the event of occurrence of longitudinal and/or rotary oscillations on the rotating construction component, these are led into the primary mass. Over the spring devices there occurs a-transfer to the secondary mass in consequence of the relative movements between the primary and the secondary masses. The secondary mass is to be laid out there in respect to its inertia in such manner that it supports a certain measure of oscillations without problems. The layout occurs by corresponding establishment of the moment of inertia 1.

The weakening of the occurring relative movement takes place over corresponding means, preferably hydraulic ones. In this case in the region of the pressure springs or of a stop for the limitation of the twisting angle, chambers are provided which are fillable with a hydraulic fluid. This fluid on occurrence of relative movement is displaced between primary mass and secondary mass, but in the process it presents a resistance.

The same principle is usable also in oscillation damping arrangements, i.e. in arrangements for torque transfer with integrated damping. These, too, comprise as a rule a primary mass and a secondary mass, which are coupleable in a corresponding manner over spring arrangements.

For the exclusion of further resonance sources there are conceivable preferably the following measures:

Reduction of the frictional damping by corresponding design and layout of the spring pots or the axial guidance of the spring pots;

pinpointed adjustability of the shear damping by layout of the axial and/or radial bearing of the individual elements—primary mass and/or secondary mass. For the reduction of the frictional damping on relative movement of the secondary mass with respect to the primary mass, the spring pot on the secondary mass is guided axially in such manner that this pot on relative movement with respect to the primary mass undergoes no additional movement relatively to the secondary mass. There the axial guidance can occur on the secondary mass, for example, over correspondingly formed sheet metal plates or set-offs. In the simplest case this effect, however, can also occur by use of two guide elements of different width for one spring element, in which case the spring element exposed to relative movement is executed more narrowly in axial direction.

DESCRIPTION OF THE DRAWINGS

The invention is explained in detail with the aid of the drawing. In this in detail the following is represented:

FIGS. 3a–3c clarify the manner of action of the spring elements of a spring device in individual functional states;

FIG. 4 clarifies the total spring curve characteristics of the spring device attainable with the arrangement of the pretensioned spring elements according to the invention comprising at least two spring elements;

FIGS. 5a, 5b clarify spring characteristic curve executions corresponding to the state of the art;

DETAILED DESCRIPTION

Figure 1:
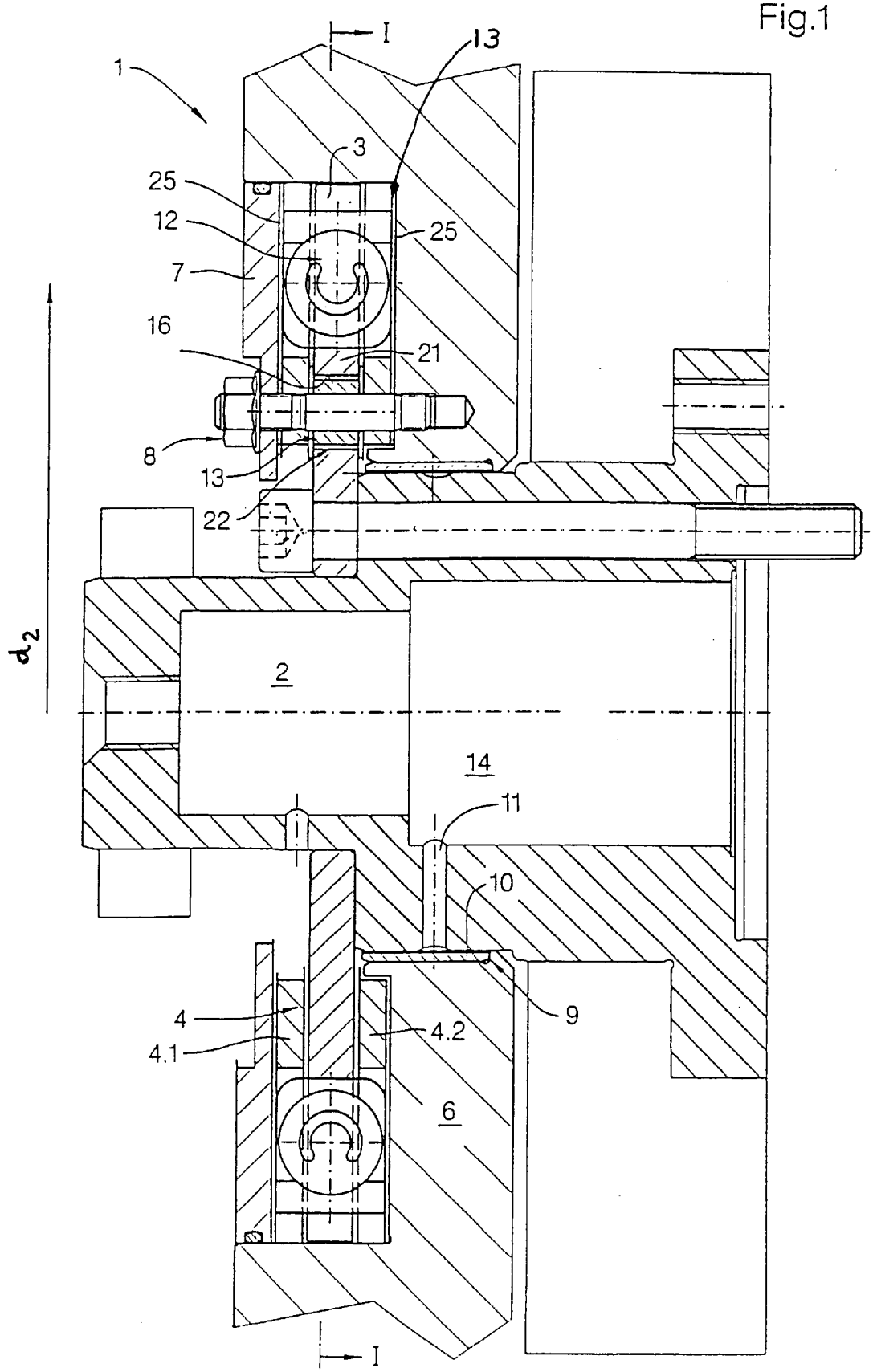
FIG. 1 shows an example of execution of a device according to the invention for the oscillation damping of a rotating construction component in axial section in the form of an oscillation damper in three-disk execution.

FIG. 1 clarifies, in axial section, an execution of a device for oscillation damping 1 of a rotating construction element, in particular an oscillation damper, which is used for the damping of longitudinal and/or rotary oscillations on a rotating component, for example a shaft 2 in three-disk construction, in which the individual disk-form elements can be composed as a component of several assembled elements. The damper 1 comprises for this two masses, a first, so-called primary mass 3 and a second, so-called secondary mass 4. The secondary mass 4 is designated also as inertia mass or flywheel ring. The primary coupled torsionally (untwistably) with the rotating component the oscillations of which are to be damped, i.e. the shaft 2. In the case represented the primary mass 3 is joined torsionally with the shaft 2. The primary mass 3 is executed in the simplest case as a disk-form element which has recesses 5 at a certain diameter in the peripheral direction, preferably in the form of passage openings. The secondary mass 4 comprises in the simplest case, two disk-form elements 4.1 and 4.2, which are coupled with a first part in the form of a flywheel ring 6. In the example of execution represented there is additionally provided a second part 7 torsionally coupled with the flywheel ring 6. Both are likewise components of the secondary mass 4. The connection between the first part 6 and the second part 7 occurs there via connecting elements 8, which are preferably executed in the form of screw connections. The radial guidance of the secondary mass 4 occurs over a bearing arrangement 9. The bearing arrangement 9 comprises for this a bearing bush 10, which is arranged in radial direction between the shaft 2 and the secondary mass 4. The bearing there is executed as a sliding bearing and is supplied with lubricant over a lubricant connection 11. In the case represented the lubricant supplying occurs via the shaft 2.

The secondary mass 4 is arranged or borne loosely with respect to the primary mass 3. A coupling between the two masses for the realization of the spring coupling is realized over at least one spring device 12, which comprises at least two pretensioned spring elements 12.1, 12.2, that are supported against one another. The spring elements of the spring device 12 are arranged for this purpose in recesses 5 in the primary mass and extend in peripheral direction of the primary mass 3 and are supported on the secondary mass 4. The arrangement, layout and functioning of pretensioned spring elements 12.1, 12.2 supported against one another, is explained in detail in FIGS. 2 and 3. The function of the spring arrangement 12 consists, during the starting and or acceleration phases, in transferring torque onto the secondary mass in order to set this into rotation. In operation, i.e. in rotation of the shaft 2, in the optimal case in which no oscillations at all occur, both—primary mass 3 and secondary mass 4—rotate at the same speed. In this case no transfer of torque occurs onto the secondary mass or this transfer occurs only to a slight extent. The latter is merely carried along.

In regard to the realization of the support of the spring devices on spring pots 20 between primary and secondary mass 3 and 4, reference can be made to the executions corresponding to DE 36 35 043 and to DE 39 16 575, the disclosure content of which in this regard is likewise included in this application.

Figure 2:
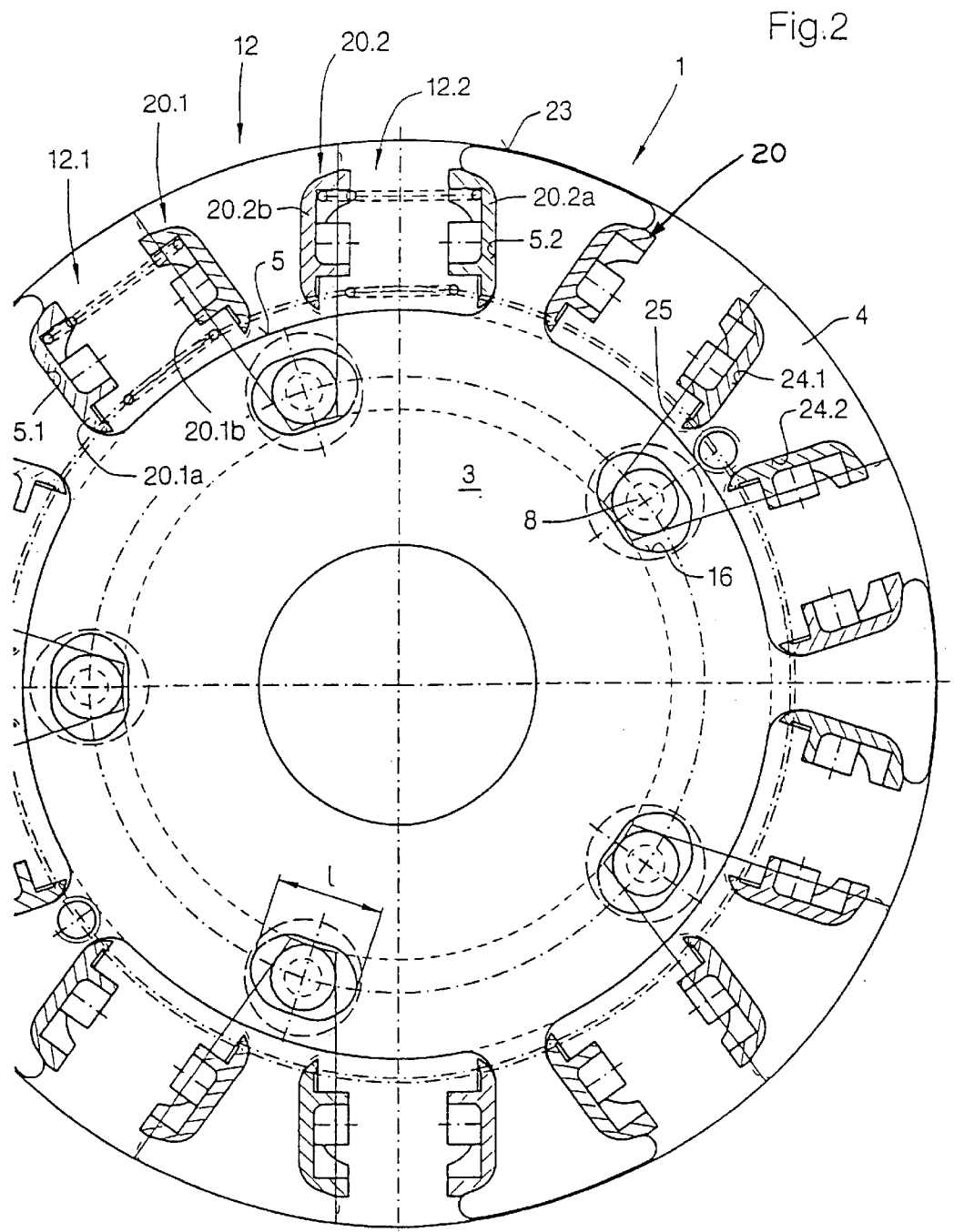
FIG. 2 shows a view of the primary mass of FIG. 1.
Figure 6:
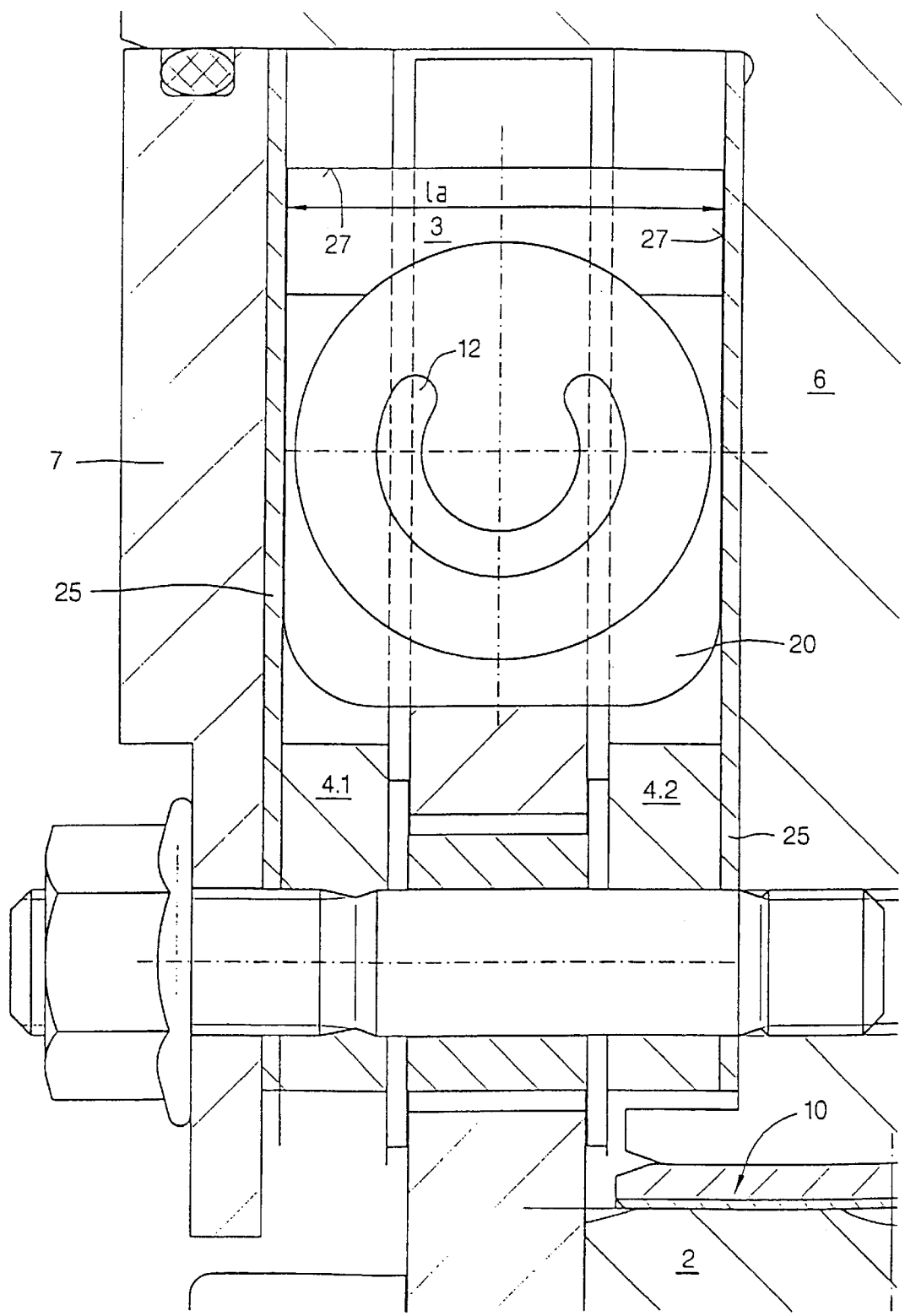
FIG. 6 clarifies a cutout from FIG. 1.
Figure 7A:
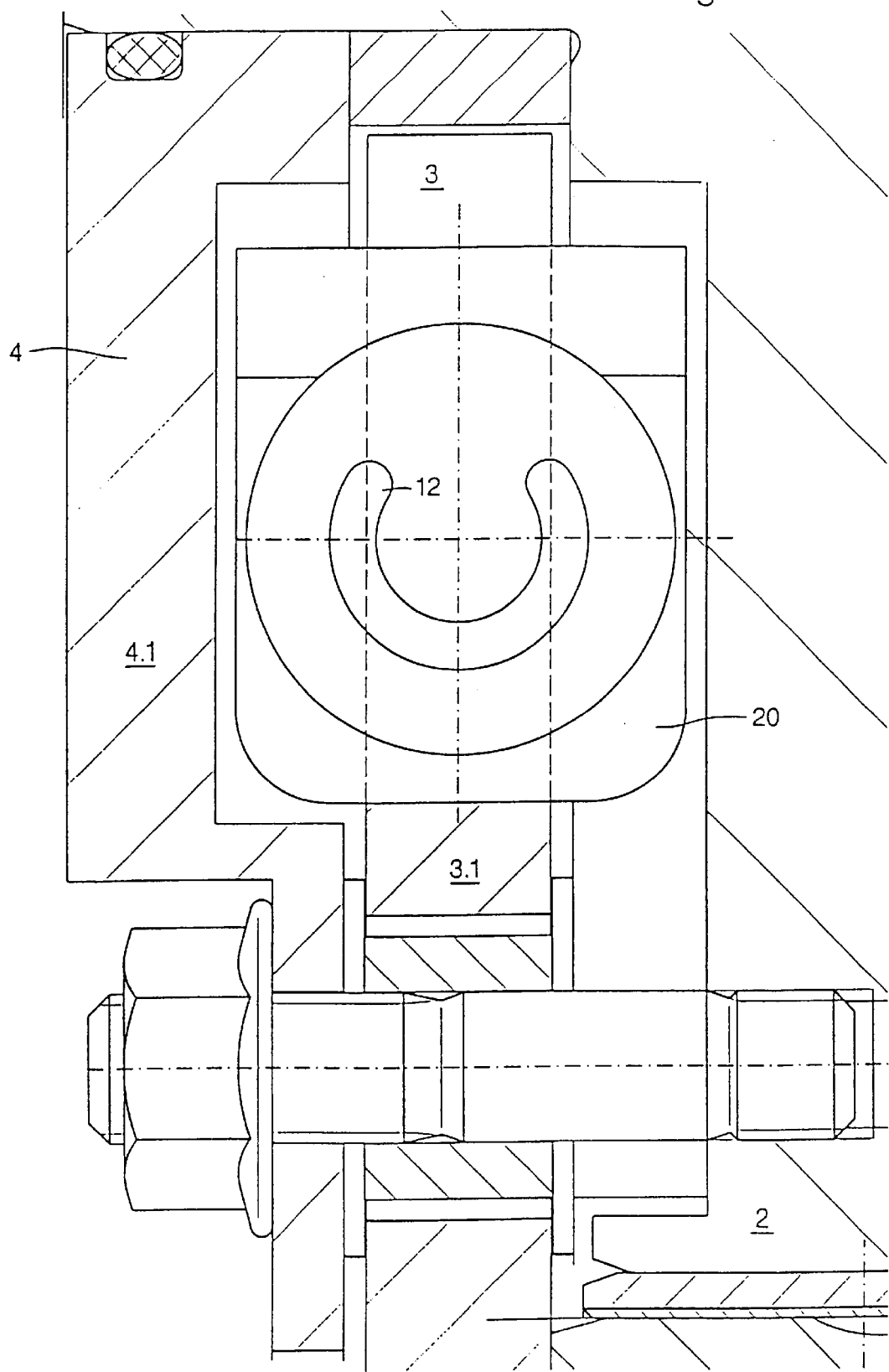
FIGS. 7a–7b explain in each case a view corresponding to FIGS. 1 and 2 of an oscillation damper in two-disk execution.

Thus it is conceivable, for example, that in the present case both parts 6 and 7 of the secondary mass present window-form cuts running over a certain diameter d2 in peripheral direction, which with respect to their spacing among one another and their size are constructed substantially complementary to the recesses on the primary mass receiving the spring devices 12 and are arranged offset to this primary mass in peripheral direction in installation position in the unburdened state offset by a half extent of the recess in peripheral direction. Both parts engage on both sides tangentially onto the spring devices or, as represented in FIG. 2, onto the guide pieces in the form of spring-guiding pots 20 allocated to their ends. It is to be noted that spring-guiding pots 20, and their respective guide elements 20.1 and 20.2, described hereinbelow, have a radial dimension greater than that of the axial dimension, as shown in FIGS. 6 and 7*a*. Further, this holds also for the recesses 5 on the primary mass.

In the event of the arising of longitudinal and/or rotary oscillations on the shaft 2, these oscillations are introduced over the torsional coupling of the primary mass 3 with the shaft 2 into the primary mass 3. Under action of a torsion moment in the operation of the rotating component there occurs then a compressing of the spring devices 12 and therewith a relative movement between the primary and the secondary masses, which leads to the setting-in of a certain twisting angle alpha, in which case the oscillations of the secondary mass 4 are compensated.

For the damping of the relative movement between the primary secondary mass 4, corresponding means are provided. In the case represented the damping occurs over a hydraulic fluid. This is filled into an interspace between the primary mass 3 and the secondary mass 4, which space is designated here with 13. The filling of the interspace here can occur in such manner that additional chambers—nor represented individually here and which can be formed between the primary and the secondary masses—are filled only in the one in which the spring devices 12 are located, or else it can occur over the entire interspace between the primary mass 3 and the secondary 4. In the case represented there is present the possibility of forming the damping chamber 22 between the bushing 21 and the oblong hole 16 enclosing the connecting element 8 in the primary mass 3. For the filling with hydraulic fluid there are yielded a large number of different possibilities. In the represented case the supplying with hydraulic fluid occurs over a corresponding hydraulic fluid feed device 14 over the shaft 2. The filling of the interspace 13 there can occur once or, according to the use case, over the rotating aggregates. There is present there theoretically also the possibility of forming the infeed or the supplying with hydraulic fluid in the interspace in such manner that the hydraulic fluid present in the interspace can also be exchanged on warming. For this purpose corresponding lead-off lines are to be provided. The represented case clarifies the possibility of supplying the interspace 13 with hydraulic fluid via the hydraulic fluid feed system 14. A component of this hydraulic fluid feed system here is the operating agent or lubricant system of the shaft 2, which system can be coupled over a connecting line with the interspace 13. From the same operating agent or lubricant supply system also the bearing arrangement 10 is supplied with lubricant.

A further possibility, not represented here, lies in filling the chambers with grease.

The twist angle alpha in peripheral direction of the primary mass 3 with respect to the secondary mass 4, which brings about a compressing of the spring device 12, which comprise preferably at least two pressure springs 12.1, 12.2, can, for example, be additionally limited. The limitation occurs then by corresponding stops on the primary mass 3. These stops are executed over oblong holes 16 in the primary mass 3, which are arranged at a certain diameter in peripheral direction and are distributed preferably in uniform spacings to one another preferably in peripheral direction. To the secondary mass 4 are allocated for this purpose projections in the zone of the diameter $d_2$ which extend in installation position into the recesses or the oblong holes of the primary mass 3. The projections there are to be executed in such manner that the oblong holes are shiftable without problems in peripheral direction with respect to the projections. It is also conceivable to assign the function of the projection-carrying element to the primary mass, and to provide the recesses on the secondary part or the secondary mass.

A friction between the two, i.e. the projections of the secondary mass 4 and of the primary mass, is to be avoided. The projections there can be a component of the secondary mass 4, i.e. they can form a constructive unit with it, or else they can be made over additional elements. In the case represented the connecting elements 8, which torsionally connect with each other the first part 6 of the secondary mass 4 and the second part 7, can take over the function of these projections. The connecting element 8 extends there through the oblong hole 16 of the primary mass 3. Over this coupling and the allocation to the primary mass 3—i.e in the represented case of the enclosing of the primary mass 3 in axial and radial direction and corresponding formation of the bearing of the secondary mass 4 and of additional elements—the secondary mass 4 is fixed in axial direction. The oblong hole or holes 16 which extend in peripheral direction on the primary mass 3 then form the stop for the connecting element 8 which limits the possible twist angle alpha on relative movement of the primary mass 3 with respect to the secondary mass 4. The twist angle alpha is limited there by the extension 1 of the oblong holes 16 in peripheral direction. The use of connecting elements for the execution of this stopping or limiting function for the twist angle alpha makes it possible to create a compact system with simple easily exchangeable components. In an execution of the secondary mass 4 with projections that form a structural unit with that secondary mass 4, there would be necessary additional measures for the axial fixing of the secondary mass 4.

FIG. 2 clarifies a view of the primary mass 3 from FIG. 1. From this there are recognizable: the oblong holes 16, the extension of the oblong holes in peripheral direction, the connecting elements 8 and the recesses for the spring devices 12, the primary mass 3 and, indicated in part, the secondary mass 4. The recess on the primary mass 3 is designated with 5. This extends in peripheral direction of the primary mass 3, as viewed in this figure, beyond the axial extension of the two springs 12.1 and 12.2 of the spring device 12, pre-tensioned against one another. The recesses are preferably arranged in the peripheral zone 23 of the primary mass 3 and executed as edge-open recesses. Preferably there are provided a large number of spring devices 12. These are preferably distributed with uniform spacing over the circumference of the device 1, in which the layout of the spring devices can be identical, but preferably should be identical.

In the case represented here, the individual springs 12.1, 12.1 of a spring device 12—which as viewed in peripheral direction are arranged in succession—are supported on the mass 3, on the sides of each spring 12.1, 12.2 facing away from each other. This support occurs at least indirectly on the stop surfaces 5.1 and 5.2 formed for the purpose in the recesses 5. The sides of the springs 12.1 and 12.2 that face each other are supported at least indirectly on the secondary mass 4. The guidance of the springs 12.1 and 12.2 occurs for this over so-called spring pots 20. These are designated by 20.1 for the spring element 12.1, and by 20.2 for the spring element 12.2. The spring pots 20.1 and 20.2 comprise two partial guide elements 20.1a and 20.1b, and 20.2a and 20.2b, respectively. The individual partial guide elements 20.1a to 20.2b are designated also as spring plates. The partial guide elements 20.la and 20.2a serve there for the support of the spring elements 12.1 and 12.2, a respectively, on the respective surfaces 5.1 and 5.2 of the primary mass 3. Over the partial guide elements 20.1b and 20.2b there occurs the support of the spring elements 12.1 and 12.2, respectively, on the secondary mass 4. The pretensioned spring elements used according to the invention are preferably executed as pressure springs. Also conceivable, however, is an execution with draw springs. The support surfaces on the secondary mass 4, designated here with 24.1 and 24.2 are formed, in this execution corresponding to FIG. 2 with reference to FIG. 1, by the elements 4.1 and 4.2.

Further, elements 25 are recognizable which in this representation are essentially V-shaped and in the view corresponding to FIG. 1 plate-like. These are arranged between the two disk-shaped elements 4.1 and 4.2 of the secondary mass 4 and with the flywheel ring 6 coupled with them. They serve to fill out the gap space between the individual elements of the primary mass 3 in the form of the middle disk 3 in a three-disk form of execution, and between those of the secondary mass 4 in the form of the disk-shaped elements 4.1 and 4.2. These serve for the axial guidance of the partial guide elements 20.1b and 20.2b, i.e. for the prevention of a relative movement perpendicularly to the drawing plane represented in FIG. 2. The partial guide elements 20.1b and 20.2b are clamped more or less rigidly by the elements 25, therefore, so that they cannot execute any axial movement or only a slight axial movement, while the partial guide elements 20.1a and 20.2a can be guided freely in axial movement. It is also conceivable to guide both partial guide elements of a spring pot axially correspondingly. By the guidance of the spring pots or of individual partial guide elements of the spring pots there is avoided harmful frictional damping or shear damping which sets with axial movement of the spring pots in the operating state with respect to the primary and secondary masses, and which again causes undesired resonances or oscillations.

The possibility represented in FIG. 2 of the axial guidance by V-shaped elements 25 represents a preferred form of execution. In the simplest case, however, there is conceivable the use of two differently wide partial guide elements of a spring pot. Other possibilities lie in the use of metal plates or offsets.

Figure 3B:
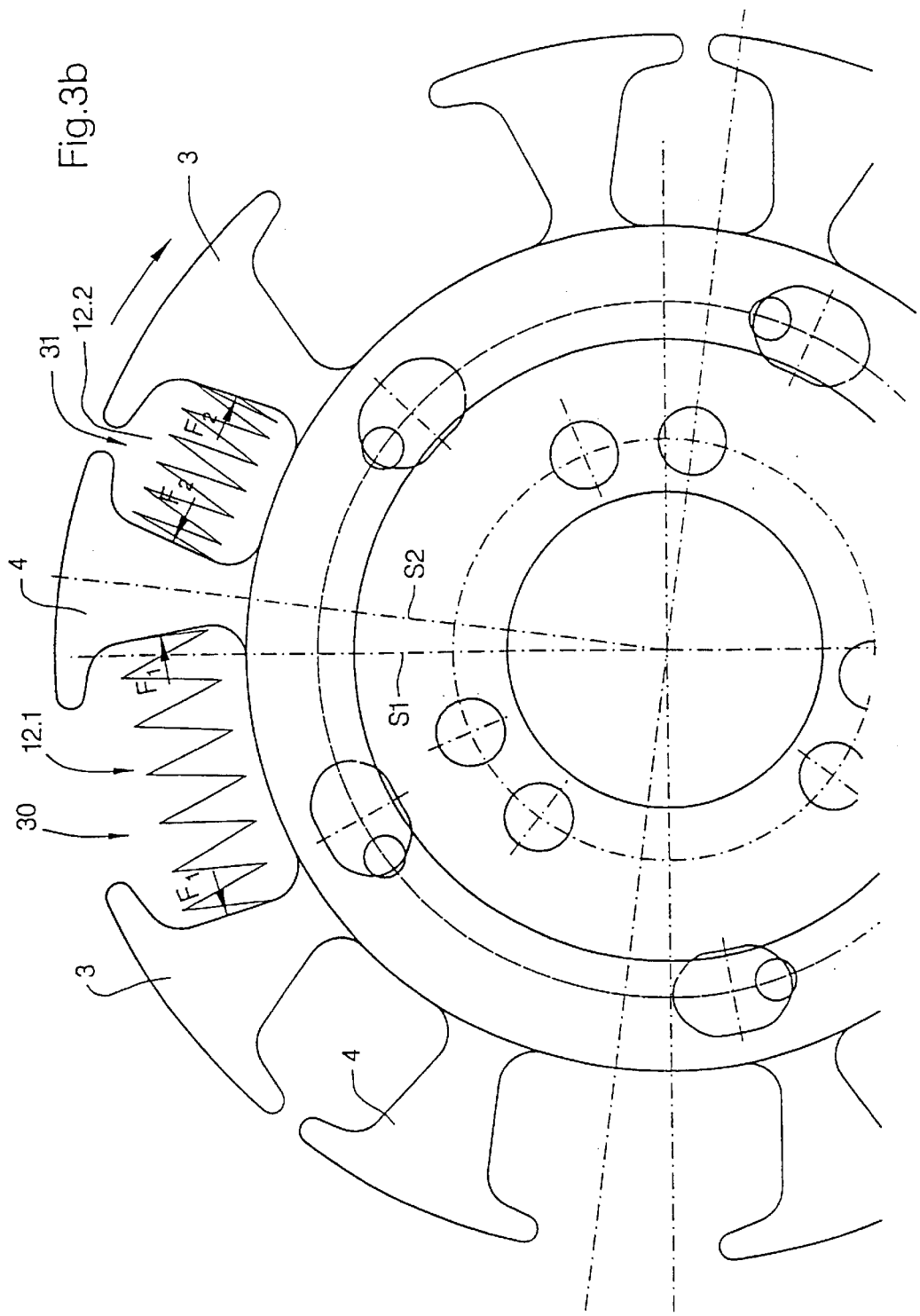

In FIGS. 3a to 3c there is clarified—with the aid of a schematically simplified representation of a device 1 for the damping of oscillations, in particular an oscillation damper corresponding to FIGS. 1 and 2, with the aid of a view corresponding to FIG. 2—the manner of functioning of the pre-tensioned spring elements 12.1, 12.2 of the spring devices 12 according to the invention.

FIG. 3a explains the so-called middle position, i.e. the zero position, between the two masses—primary mass 3 and secondary mass 4—of a device 1 for oscillation damping in a rotation construction element, especially of an oscillation damper, in a severely schematized and simplified representation. There is recognizable the recess 5 (strongly reinforced in the drawing), which forms the two stop surfaces 5.1 and 5.2; further, a corresponding complementary recess 27 (indicated with dot-and-dashed lines) in the secondary part 4 which forms the stop surfaces 24.1 and 24.2. The recess 27 on the secondary mass 4 and also the recess 5 on the primary mass 3 are preferably executed identically in respect to their extent in peripheral direction. In the middle position, i.e. zero position, the element or elements carrying the stop surfaces 24.1 and 24.2 of the secondary mass 4 are arranged in such manner with respect to the recess 5 that these, as viewed in the view from the right, occupy a middle position in the recess 5, i.e. centrally to the two stop surfaces 5.1 and 5.2 on the primary mass 3. Between primary mass and secondary mass, especially stop surfaces 5.1 and 24.1 as well as 5.2 and 24.2 in peripheral direction, there are formed the receiving zones 30 and 31 for the spring elements 12.1 and 12.2 of a spring device 12. These are executed essentially of equal size in the middle position in peripheral direction, and the spring elements 12.1 and 12.2 act with equal pretension on the stop surfaces 5.1, 5,2 and 24.1 and 24.2, respectively. The middle position corresponds there to the position of the two flywheel masses—primary mass and secondary mass—relative to each other, in which no relative movement is generated between the two by oscillations arising on the rotating components.

FIGS. 3b and 3c explain two possible positions of the primary mass 3 and secondary mass 4 relative to each other in the functional state "damping or compensation of oscillations" of the oscillation damper, i.e. on deflection of the spring devices 12, represented in each case for a spring device 12. In the relative movement of the secondary mass 4 and therewith of the disk-form elements 4.1, 4.2 in peripheral direction in turning direction corresponding to FIG. 3b there occurs a deflection on the spring element 12.2, while the spring element 12.1 is unburdened, but still has a certain but lesser load. The relative movement between primary mass 3 and secondary mass 4 is explained with the aid of the change of position of the symmetry axes S1 for the primary mass and S2 for the secondary mass with respect to the middle position in FIG. 3a, in which the two symmetry axes S1 and S2 lie one over the other, or it clarifies the twist angle. The relative movement of the secondary mass 4 with respect to the primary mass 3 proceeds in the case represented with an enlargement of the spring receiving zone 30 and a diminution of the spring receiving zone 31, in which corresponding forces act on the spring elements 12.1 and 12.2 and further pretension the spring element 12.2 and relieve the spring element 12.1.

In FIG. 3c there is represented, further, the state of the spring deflection on action of a moment on the secondary mass 4 and therewith relative movement in a direction opposite to that in FIG. 3b. The manner of functioning is the same.

With the use according to the invention of spring devices, comprising two spring elements 12.1, 12.2 supported against one another and pretensioned, which have a pretension also in the deflected state, i.e. with force action or unburdening, there is achieved a spring characteristic curve corresponding to FIG. 4. From this it is evident that the total spring arrangement 12, independently from the relative movement setting in between primary mass and secondary mass under tension or pressure stress has an essentially linear characteristic curve. Deformations, i.e. spring path and force, are in all load states directly proportional to one another. Undesired resonances which are evoked by severe changes in the course of the characteristic curve are avoided. The diagram in FIG. 4 clarifies the spring characteristic curve of the spring device 12 with a certain spring constant c in a diagram of force and twist angle between primary and secondary mass.

Figure 5B:
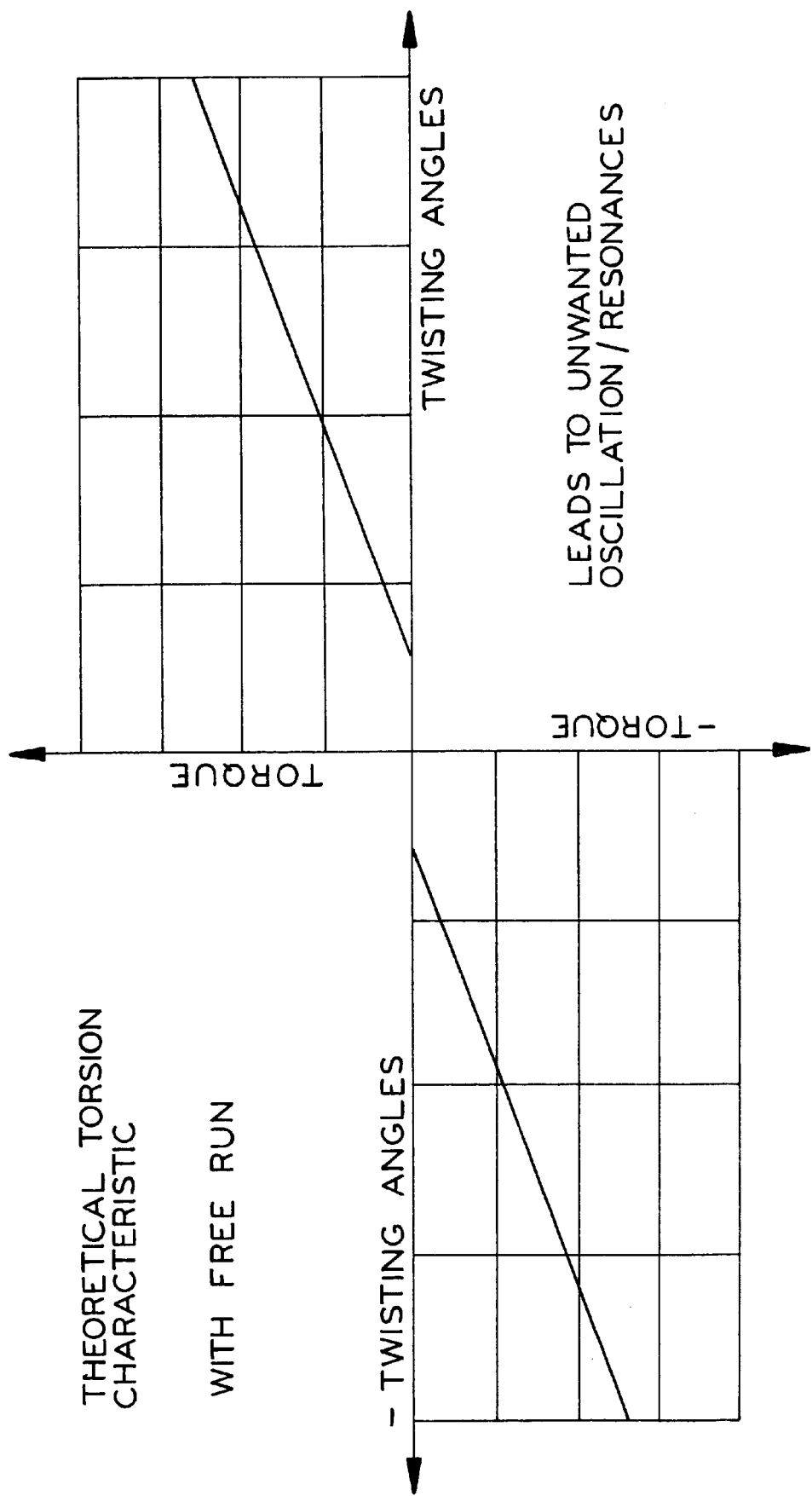

In FIGS. 5a and 5b there are presented for comparison the characteristic curves of spring devices as they are used in executions corresponding to the state of the art. From this it becomes evident that with use only of one spring element only in a spring arrangement, in the operating range "load change" (change of the twisting direction between primary and secondary mass) this has either a jump point (FIG. 5a) or a free run (FIG. 5b). The jump points and free runs occurring in the transition between the individual load types in the spring characteristics, in the transition from one load state to another load state, for example from tension load to pressure load or vice versa, bring about on the spring element an abrupt rise of the forces supplied by the spring arrangements. These changes, in turn, are the cause of undesired resonances which have a disadvantageous effect on the damping result desired for the damping device.

The solution according to the invention is used preferably in so-called oscillation dampers, i.e. devices for oscillation damping which are executed in such manner that these transfer no torque in the operating range of a drive device. Also conceivable, however, is a use in combined oscillation dampers-oscillation damper arrangements—or in pure oscillation dampers which transfer torque during the operation of the drive machine, for example in executions of oscillation dampers in the form of couplings.

In FIG. 6 there is once again presented an execution of an oscillation damper corresponding to FIG. 1 with the aid of an enlarged cutout. This is executed in three-disk construction manner. For like elements there are used the same reference numbers.

Figure 7B:
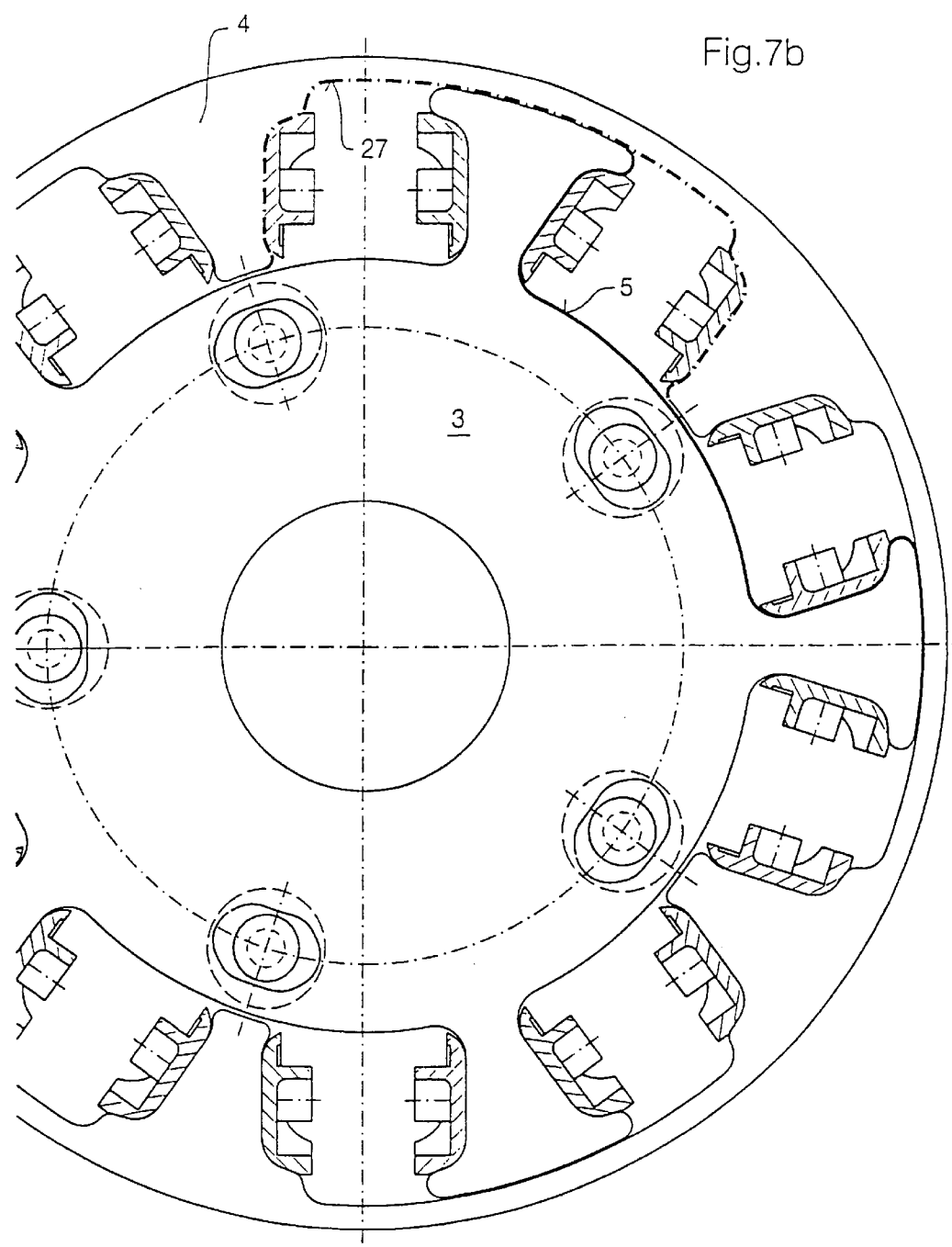

In FIG. 7a there is represented in contrast an execution corresponding to FIG. 1 in so-called two-disk construction manner. The primary mass 3 comprises there only one disk-form element 3.1, while the secondary mass 4 likewise comprises only one disk-form element 4.1. This execution offers an especially compact formation of an oscillation damper. The arrangement of the spring elements or spring arrangements occurs analogously to FIG. 1 and is represented in FIG. 7b. The guiding of the spring elements on the individual masses differs from the execution represented in FIG. 1 in that the recesses on the secondary mass are not arranged on its outer circumference and are edge-open.

A further preferably used measure for reducing undesirably arising resonances consists in the adjustment of the gaps and surfaces provided between the individual elements of the oscillation damper movable relatively to one another for the purpose of reducing the so-called shear damping which sets in on relative movement of fluid with respect to solid bodies. The adjustment occurs there over corresponding axial bearing of the individual elements movable relatively to one another in peripheral direction.

Figure 8:
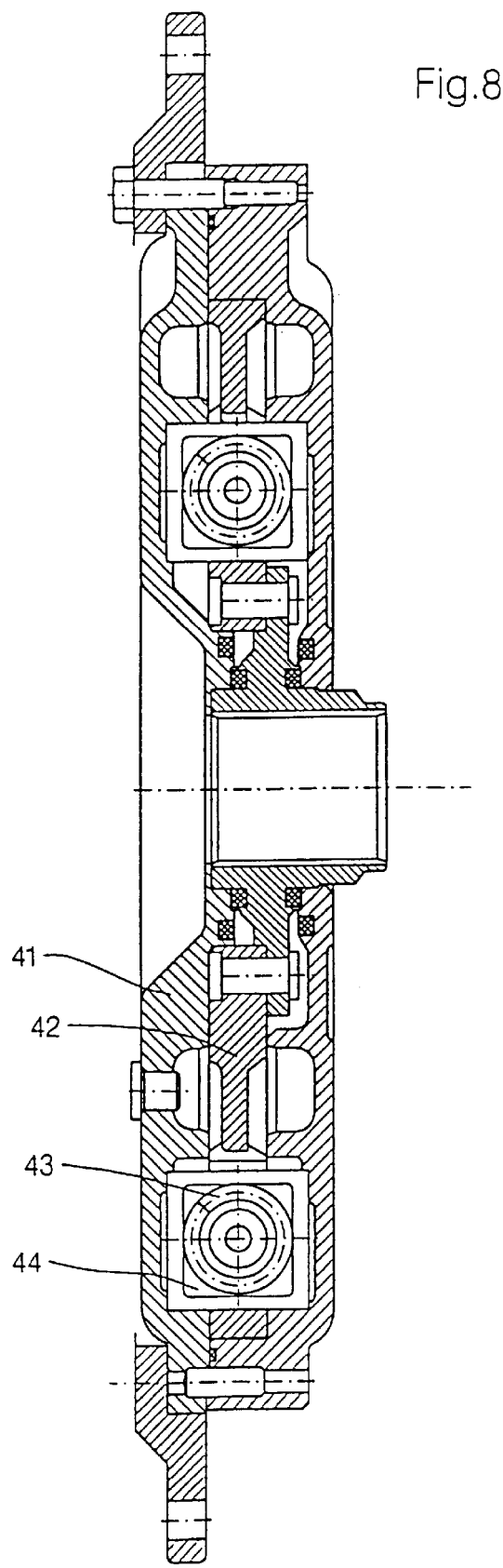
FIG. 8 shows a case of application of the solution according to the invention for a torsion oscillation damper.

The arrangement of the spring elements of a spring device according to the invention is likewise usable for an oscillation damping device in the form of a torsion oscillation damper according to FIG. 8. The torsion oscillation damper comprises two flywheel masses, a first flywheel mass 41 and a second flywheel mass 42. The one of the two flywheel masses there is connectable untwistably with the drive side, as viewed in traction operation, in particular a combustion motor, while the other, second flywheel mass 42 on-off-drive side as-viewed with force flow direction in traction operation from the drive machine for off-drive is connectable, for example, with a gear input shaft. The two flywheel masses 41 and 42 are limitably turnable in peripheral direction relatively to one another, and, namely, counter to the force of the spring devices 43 which are distributed over the circumference of the torsion oscillation damper. The spring arrangements are located, for example, inside a damping chamber 44, which can be filled with grease.

Figure 9:
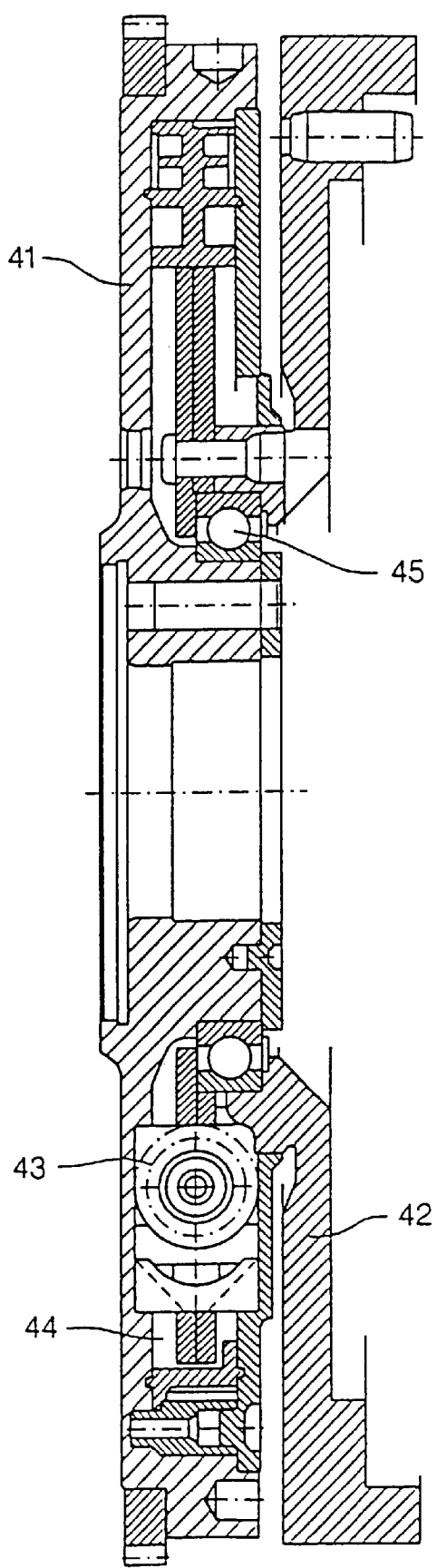
FIG. 9 explains a case of application of the solution according to the invention for a two-mass flywheel.

In FIG. 9 there is represented a concrete execution of a torsion oscillation damper in the form of a two-mass flywheel 45. This likewise has two flywheel masses 41 and 42, which are borne on one another over a bearing 4. One of the two flywheel masses, the drive-side flywheel mass 41, is torsionally connectable with the drive side as viewed in traction operation, in particular with a combustion engine, while the other, second flywheel 42, the off-drive flywheel mass, arranged downstream of the first flywheel mass 41 as viewed in traction, is connectable with a friction coupling. There is present there the possibility that the off-drive flywheel mass already forms a friction surface of the friction coupling. Here too there are again provided a spring element 45 as well as a coupling chamber 44. This latter is filled entirely or partially with grease. The spring elements are executed in correspondence to FIGS. 1 to 7.

What is claimed is:

1. Device for oscillation damping on rotating components with two flywheel masses—a primary mass and a secondary mass—which are limitedly rotatable relatively to one another in peripheral direction; the primary mass and the secondary mass are coupled with one another over a damping coupling and a spring coupling; with means for the execution of the spring coupling comprising at least one spring device; characterized by the following features:

each spring device comprises at least two spring elements—a first spring element and a second spring element;

each individual spring element of the spring device is preloaded and is supported on the primary mass and the secondary mass;

the spring elements of the spring device are allocated to the primary mass and the secondary mass in such manner that the spring elements undergo a mutual support;

the primary mass is at least indirectly coupleable with a rotating component in a torsionally stiff manner;

the secondary mass is free from a direct torsional coupling in a torsionally stiff manner with the rotating component;

means for the damping coupling comprising at least one hydraulic fluid supply system;

the hydraulic fluid supply system is coupled with an interspace between the primary mass and the secondary mass; and further means for limiting the twist angle of the primary mass with respect to the secondary mass peripheral direction, comprising at least one projection arranged on one of the primary mass and the secondary mass and engaging a recess on the other of the primary mass and the secondary mass in the peripheral direction and in an installation direction in such manner that the projection is relatively shiftable with respect to the mass having the recess thereon; the recess in the peripheral direction forming a stop for the projection.

2. Device for oscillation damping according to claim 1, characterized in that the preloading of the individual spring elements is apportioned to a spring arrangement in such manner that on complete deflection of the first spring element by reason of the relative movement of the two flywheel masses the other, second spring element has a load, but of less magnitude.

3. Device according to claim 1, characterized in that the spring elements are executed as pressure springs.

4. Device according to claim 1, characterized in that the springs are executed as drawsprings.

5. Device according to claim 1, characterized by the following features:

the primary mass comprises first recesses running in the peripheral direction;

the secondary mass comprises second recesses which with respect to the spacing and size thereof are executed essentially complimentarily to the first recesses, which are arranged on the primary mass in the peripheral direction forming at least two reception zones for the spring elements offset to the primary mass;

to each spring element there is allocated at the spring ends in each case a guide body on which in each case the two masses- primary mass and secondary mass—engage tangentially in the zone of the recesses.

6. Device according to claim 5, characterized in that in a non-functioning state, the primary mass and the secondary mass are arranged in such manner to one another that both receiving zones have equal dimensions in the peripheral direction.

7. Device according to claim 5, characterized in that a plurality of guide elements which engages the secondary mass, are guided axially in the secondary mass.

8. Device according to claim 7, characterized in that the axial guidance occurs by means of plate-form elements which are allocated to the secondary mass.

9. Device according to claim 1, characterized in that the device is executed as an oscillation damping device with the following features:

the primary mass is coupleable at least indirectly torsionally with a drive-side rotating component.

10. Device according to claim 1, characterized in that the secondary mass comprises disk-form elements which, as viewed in axial section, are arranged on both sides of the primary mass.

11. Device according to claim 1, characterized in that the primary mass and the secondary mass are constructed in each case as a disk-form element.

12. Device for oscillation damping according to claim 1, characterized in that the projection is realized via a connecting element in the form of a screw.

13. Device according to claim 1, characterized in that a plurality of guide elements allocated to the spring element are executed with a different dimension in the axial direction.

14. Device according to claim 1, characterized in that the projection is arranged on the secondary mass and the recess is on the primary mass.

* * * * *

UNITED STATES PATENT AND TRADEMARK OFFICE
CERTIFICATE OF CORRECTION

PATENT NO.    : 6,471,593 B1
DATED         : October 29, 2002
INVENTOR(S)   : Wolfgang Hanke et al.

It is certified that error appears in the above-identified patent and that said Letters Patent is hereby corrected as shown below:

<u>Column 14,</u>
Line 5, after "component" delete "." and insert -- , the secondary mass is torsionally coupleable with an off drive-side component; the secondary mass forms an element of a coupling arrangement. --

Signed and Sealed this

Eighteenth Day of March, 2003

JAMES E. ROGAN
*Director of the United States Patent and Trademark Office*